(12) United States Patent
Okada et al.

(10) Patent No.: US 8,512,813 B2
(45) Date of Patent: Aug. 20, 2013

(54) COATING COMPOSITION, COATING FILM MADE OF SAME, AND OPTICAL ARTICLE

(75) Inventors: Hiroyuki Okada, Tokyo (JP); Motoharu Takeuchi, Tokyo (JP); Masahiro Johno, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/466,964

(22) Filed: May 8, 2012

(65) Prior Publication Data

US 2012/0219807 A1    Aug. 30, 2012

Related U.S. Application Data

(63) Continuation of application No. 10/564,056, filed as application No. PCT/JP2004/010688 on Jul. 21, 2004, now abandoned.

(30) Foreign Application Priority Data

Jul. 24, 2003  (JP) ................................. 2003-279472
Aug. 1, 2003  (JP) ................................. 2003-285448

(51) Int. Cl.
*B32B 9/04*   (2006.01)

(52) U.S. Cl.
USPC ............. 427/387; 427/385.5; 427/389.7; 427/393.5; 428/419; 524/731

(58) Field of Classification Search
USPC ............... 428/419; 427/387, 385.5, 389.7, 427/393.5; 524/731
See application file for complete search history.

(56) References Cited

U.S. PATENT DOCUMENTS

| | | | | |
|---|---|---|---|---|
| 4,235,654 A | * | 11/1980 | Dohi et al. | 156/99 |
| 4,477,366 A | * | 10/1984 | Robertson | 106/38.22 |
| 5,043,409 A | * | 8/1991 | Lammerting et al. | 528/31 |
| 5,178,800 A | * | 1/1993 | Blum | 264/1.38 |
| 5,428,092 A | * | 6/1995 | Ishikawa et al. | 524/262 |
| 5,486,322 A | * | 1/1996 | Fuchs | 264/46.5 |
| 5,599,778 A | | 2/1997 | Ishikawa et al. | |
| 5,693,738 A | | 12/1997 | Okazaki et al. | |
| 5,777,000 A | | 7/1998 | Sakagami et al. | |
| 5,945,504 A | | 8/1999 | Amagi et al. | |
| 6,130,307 A | | 10/2000 | Amagai et al. | |
| 6,207,728 B1 | | 3/2001 | Sekiguchi et al. | |
| 6,261,665 B1 | | 7/2001 | Murata et al. | |
| 6,303,747 B1 | | 10/2001 | Okazaki et al. | |
| 6,472,495 B1 | | 10/2002 | Yoshimura et al. | |
| 6,528,595 B1 | | 3/2003 | Ikawa et al. | |
| 7,169,845 B2 | | 1/2007 | Tamura et al. | |
| 2003/0100641 A1 | | 5/2003 | Jiang et al. | |
| 2005/0261467 A1 | * | 11/2005 | Tamura et al. | 528/380 |

FOREIGN PATENT DOCUMENTS

| | | |
|---|---|---|
| EP | 0 033 043 | 8/1981 |
| JP | 09-071580 | 3/1997 |
| JP | 09-110979 | 4/1997 |
| JP | 10-298287 | 11/1998 |
| JP | 11-209686 | 8/1999 |
| JP | 11-209689 | 8/1999 |
| JP | 2002-173533 | 6/2002 |
| JP | 2002-302549 | 10/2002 |
| JP | 2003-089759 | 3/2003 |
| WO | WO 02/24786 | 3/2002 |
| WO | WO 02/083763 | 10/2002 |

OTHER PUBLICATIONS

Supplementary European Search Report dated Jun. 23, 2006, for EP Application No. 04 74 8000.
Taiwanese Official Action dated Nov. 18, 2011, for TW Application No. 10021029170.

* cited by examiner

*Primary Examiner* — Margaret Moore
(74) *Attorney, Agent, or Firm* — Antonelli, Terry, Stout & Kraus, LLP.

(57) ABSTRACT

There is provided a coating composition having a good wetting property which is capable of forming a coating film exhibiting a high refractive index, a less discoloration, and excellent transparency and uniformity when polymerized and cured. The present invention relates to a coating composition comprising (A) 100 parts by weight of a thiirane ring-containing compound, (B) 0.0001 to 10 parts by weight of a catalyst for accelerating polymerization of the thiirane ring-containing compound, and (C) 0.005 to 4 parts by weight of a modified silicone oil; a coating film produced from the composition; and an optical product provided with the coating film.

14 Claims, No Drawings

COATING COMPOSITION, COATING FILM MADE OF SAME, AND OPTICAL ARTICLE

This application is a Continuation application of application Ser. No. 10/564,056, filed Jan. 10, 2006, now abandoned, the contents of which are incorporated herein by reference in their entirety. Ser. No. 10/564,056 is a National Stage Application, filed under 35 USC 371, of International (PCT) Application No. PCT/JP2004/010688, filed Jul. 21, 2004.

TECHNICAL FIELD

The present invention relates to coating compositions used for forming a coating film on a glass substrate, a quartz substrate, a silicon substrate, a metal substrate, a plastic substrate, a plastic film, etc., and more particularly to coating compositions capable of forming a coating film having a high refractive index, a less discoloration, and excellent transparency, uniformity and adhesion property when polymerized and cured, which are useful as coating materials for optical products applied to various displays, etc.; coating films obtained by polymerizing and curing the composition; and optical products provided on a surface thereof with the coating film.

BACKGROUND ART

As typical transparent resins, there are known polymethyl methacrylate (PMMA), polycarbonates (PC), polyethylene terephthalate (PET), epoxy resins, polyethylene (PE), polypropylene (PP) and the like. However, these resins have a refractive index of about 1.60 at the maximum.

On the other hand, the present inventors have already found the novel sulfur-containing compounds having an episulfide structure, and have developed transparent resins having a refractive index of 1.71 which is far higher than those of the conventionally existing resins (refer to JP 9-71580A and JP 9-110979A). In these previous inventions made by the present inventors, the sulfur-containing compounds having an episulfide structure are cast into a so-called mold and then polymerized and cured to obtain a cured product thereof. However, these methods are limited only to production of lenses or substrates themselves. Nevertheless, owing to the remarkable high refractive index of the transparent resins, there is a strong demand for applying the transparent resins to coating materials for various substrates or films.

However, since coating materials made of the transparent resins generally exhibit a poor wetting property to various substrates, it is difficult to stably form a thin film having a thickness of from several μm to several tens μm.

As an example of film-like cured products made of thiirane ring-containing compounds, there are disclosed rapid-curing adhesives for electronic materials (refer to JP 11-209686A, PCT Pamphlet WO 00/46317 and JP 2002-173533A). However, these conventional adhesives all require further addition of curing agents such as epoxy-based and amine-based curing agents to enhance a peel strength of the resultant cured products. Further, the above related documents have failed to specify a refractive index, a discoloration, a transparency and a uniformity of the adhesives, since the object thereof is not to study and improve these properties.

In addition, there have been proposed compositions composed of the thiirane ring-containing compound and a silane coupling agent, for example, spectacle lens compositions (refer to JP 10-298287A) and dental opaque coatings (refer to JP 2003-89759). However, JP 10-298287A describes no effect obtained by addition of the silane coupling agent, though it is deemed that the silane coupling agent is added to control close contact between the lens and a glass mold. Also, in JP 10-298287A, a massive cured lens is finally released from the glass mold to achieve the object aimed by the invention. Thus, the invention described in JP 10-298287A is quite different in technical concept from the present invention which is intended to improve the adhesion property, and aims to produce film-like optical products bonded to a substrate.

Also, JP 2003-89759A describes thiirane ring-containing compounds merely as an example of polymerizable monomers, and fails to provide specific embodiments or examples using the thiirane ring-containing compounds. Further, in JP 2003-89759A, (meth)acrylic compounds are specified as the polymerizable monomers, and in order to satisfy the coating performance, it is required to use may other components such as fluorocarbon group-containing polymerizable monomers. In addition, the coating film described in JP 2003-89759A is used for dental purposes and, therefore, is required to exhibit a high hiding property. Thus, the invention described in JP 2003-89759A is also quite different in technical concept from the present invention seeking a high transparency.

An object of the present invention is to provide coating compositions capable of forming a coating film having a high refractive index, a less discoloration, and excellent transparency, uniformity and adhesion property when polymerized and cured; coating films produced from the composition; and optical products provided on a surface thereof with the coating film.

DISCLOSURE OF THE INVENTION

As a result of extensive studies to solve the above problems, the inventors have found that coating compositions comprising (A) 100 parts by weight of a thiirane ring-containing compound, (B) 0.0001 to 10 parts by weight of a catalyst for accelerating polymerization of the thiirane ring-containing compound, and (C) 0.005 to 4 parts by weight of a modified silicone oil can exhibit a good wetting property, and a coating film obtained by polymerizing and curing the coating composition can exhibit a high refractive index, a less discoloration and excellent transparency and uniformity. The present invention has been accomplished on the basis of the finding Further, the inventors have found that when the thiirane ring-containing compound has at least one structure represented by the following structural formula (1):

the composition using the compound is suitable as a coating material, and the coating film produced from the coating composition can exhibit a higher refractive index.

PREFERRED EMBODIMENTS FOR CARRYING OUT THE INVENTION

The coating composition of the present invention exhibits a good wetting property, and is capable of forming on a surface of glass, plastic, etc., a coating film having a high refractive index, a less discoloration and excellent transparency, uniformity and adhesion property. The too thin coating film tends to be insufficient in protection of a base material or exhibition of its aimed property, whereas the too thick coating film tends to cause increase in size and weight of the resultant optical products. Therefore, the thickness of the coating film is practically about 0.1 to 1000 μm, preferably about 0.5 to 500 μm and more preferably about 1 to 100 μm.

The thiirane ring-containing compound (A) used in the present invention is subjected to ring opening polymerization to produce a coating film. The thiirane ring-containing compound is such an organic compound containing one or more thiirane rings in a molecule thereof. In view of a high refractive index of the obtained optical elements, the thiirane ring-containing compound is preferably a compound having at least one structure represented by the following structural formula (1):

(1)

Further, in view of a good surface hardness of the obtained coating film, the thiirane ring-containing compound is more preferably a compound having two or more structures represented by the structural formula (1), and in view of obtaining a liquid coating composition having an adequate viscosity for an easy-handling property thereof, the thiirane ring-containing compound is still more preferably a chain-like compound having two or more structures represented by the structural formula (1). When the above requirements are totally taken into consideration, the thiirane ring-containing compound is most preferably a compound represented by the following structural formula (2):

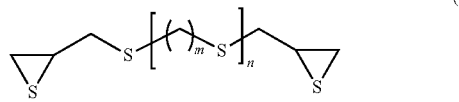
(2)

wherein m is an integer of 0 to 4; and n is an integer of 0 to 2.

Specific examples of the thiirane ring-containing compound (A) used in the present invention include ethylene sulfide, propylene sulfide, cyclohexene sulfide, styrene sulfide, thioglycidol, 1,1-bis(epithioethyl)methane, tetrakis(β-epithiopropyl)methane, 1,1,1-tris(β-epithiopropyl)propane, (1,3- or 1,4-)-bis(epithioethyl)cyclohexane, 2,5-bis(epithioethyl)-1,4-dithiane, 4-epithioethyl-1,2-cyclohexene sulfide, 4-epoxy-1,2-cyclohexene sulfide, methylthioglycidyl ether, bis(β-epithiopropyl)ether, 1,2-bis(β-epithiopropyloxy)ethane, tetrakis(β-epithiopropyloxymethyl)methane, 1,1,1-tris(β-epithiopropyloxymethyl)propane, bis[4-(β-epithiopropyloxy)cyclohexyl]methane, 2,2-bis[4(β-epithiopropyloxy)cyclohexyl]propane, bis[4-(β-epithiopropyloxy)cyclohexyl]sulfide, 2,5-bis(β-epithiopropyloxymethyl)-1,4-dithiane, (1,3- or 1,4-)-bis(β-epithiopropyloxy)benzene, (1,3- or 1,4-)-bis(β-epithiopropyloxymethyl)benzene, bis[4-(β-epithiopropyloxy)phenyl]methane, 2,2-bis[4-(β-epithiopropyloxy)phenyl]propane, bis[4-(β-epithiopropyloxy)phenyl]sulfide, bis[4-(β-epithiopropyloxy)phenyl]sulfone, 4,4'-bis(β-epithiopropyloxy)biphenyl, bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1,4-bis(β-epithiopropylthio)butane, 1,5-bis(β-epithiopropylthio)pentane, 1,6-bis(β-epithiopropylthio)hexane, bis(β-epithiopropylthioethyl)sulfide, tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-(β-epithiopropylthiomethyl)-3,6-dithiaoctane, 1,9-bis(β-epithiopropylthio)-5-(β-epithiopropylthiomethyl)-5-[(2-β-epithiopropylothioethyl)thiomethyl]-3,7-dithianonane, 1,10-bis(β-epithiopropylthio)-5,6-bis[(2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)thiomethyl]-3,6,9-trithiaundecane, 1,11-bis(β-epithiopropylthio)-4,7-bis(β-epithiopropylthiomethyl)-3,6,9-trithiaundecane, 2,5-bis(epithiopropylthiomethyl)-1,4-dithiane, 2,4,6-tris(epithiopropylthiomethyl)-1,3,5-trithiane, (1,3- or 1,4-)-bis(β-epithiopropylthio)benzene, (1,3- or 1,4-)-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone, 4,4'-bis(β-epithiopropylthio)biphenyl, bis(β-epithiopropyl)selenide, bis(β-epithiopropyl)diselenide, bis(β-epithiopropyl)telluride, bis(β-epithiopropyl)ditelluride, vinylphenylthioglycidyl ether, vinylbenzylthioglycidyl ether, thioglycidyl methacrylate, thioglycidyl acrylate and allylthioglycidyl ether, as well as thiirane ring-containing compounds obtained by replacing one or more hydrogen atoms of the above exemplified compounds with methyl groups.

Among these thiirane ring-containing compounds (A), more preferred are bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,4-bis(β-epithiopropylthio)butane, 1,5-bis(β-epithiopropylthio)pentane, 1,6-bis(β-epithiopropylthio)hexane and bis(β-epithiopropylthioethyl)sulfide.

Specific examples of the catalyst for accelerating polymerization of the thiirane ring-containing compound include amines such as triethylamine, N,N-dimethyl cyclohexylamine, N,N-diethylethanol amine, N,N-dimethyl aniline, pyridine, N-methyl piperidine, piperazine triethylene diamine and imidazole, phosphines such as tri-n-butyl phosphine and triphenyl phosphine, quaternary ammonium salts such as tetra-n-butyl phosphonium bromide, tetra-n-butyl ammonium bromide, triethylene benzyl ammonium chloride, cetyldimethyl benzyl ammonium chloride and 1-n-dodecyl pyridinium chloride, quaternary phosphonium salts such as tetraphenyl phosphonium bromide.

Although only a part of the catalysts (B) for accelerating polymerization of the thiirane ring-containing compound are illustrated above, the catalyst (B) is not particularly limited to these illustrative compounds, and any suitable compounds may be used as the catalyst (B) as long as they can exhibits the effect of accelerating the polymerization. Also, these catalysts may be used alone or in the form of a mixture of any two or more thereof. The amount of the catalyst (B) added is 0.0001 to 10.0 parts by weight and preferably 0.0005 to 5.0 parts by weight based on 100 parts by weight of the thiirane ring-containing compound (A).

Also, in addition to the catalyst for accelerating the polymerization, a polymerization controller may be added to the composition, if required, in order to control the polymerization reaction. Examples of the polymerization controller effectively used in the coating composition of the present invention include halides of elements belonging to Groups 13 to 16 of the long-form Periodic Table such as typically halogenated tin compounds and halogenated germanium compounds. These polymerization controllers may be used alone or in the form of a mixture of any two or more thereof. The amount of the polymerization controller used is 0.0001 to 10.0 parts by weight based on 100 parts by weight of the thiirane ring-containing compound (A).

The modified silicone oil (C) used in the present invention is represented by any of the following structural formulae (3) to (6), and the addition of the modified silicone oil (C) allows the coating composition to be improved in wetting property.

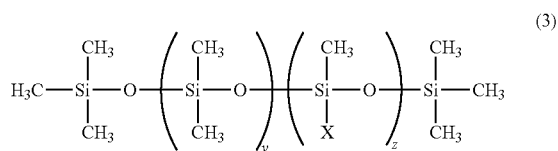

(3)

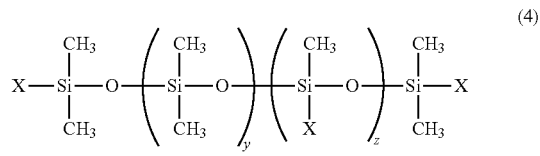

(4)

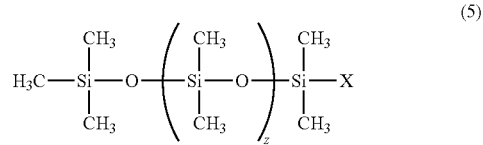

(5)

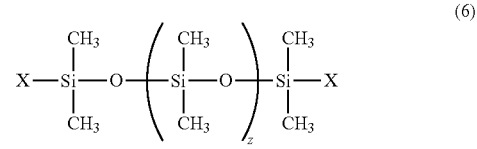

(6)

wherein X is each independently halogen, an alkoxy group having 1 to 36 carbon atoms, an alkyl group having 1 to 36 carbon atoms, an aliphatic ester group having 1 to 36 carbon atoms, a polyether group which may contain a hydrocarbon group having 1 to 36 carbon atoms in total, etc.; and y and z are each independently an integer of 1 or more.

In view of the positional structure, the modified silicone oils (C) are generally classified into a side chain-modified type represented by the above structural formula (3), a side chain/both terminal end-modified type represented by the above structural formula (4), one terminal end-modified type represented by the above structural formula (5) and a both terminal end-modified type represented by the above structural formula (6). Also, in view of the chemical structure, the modified silicone oils (C) are generally classified into reactive types such as an amino-modified type, an epoxy-modified type, a carboxyl-modified type, a carbinol-modified type, a (meth)acryloyl-modified type, a mercapto-modified type, a phenol-modified type and a different functional group-modified type, and non-reactive types such as a polyether-modified type, a methylstyryl-modified type, an alkyl-modified type, a higher fatty ester-modified type, a hydrophilic special modified type, a higher alkoxy-modified type, a fluorine-modified type and a higher fatty acid-containing type.

In the present invention, among the above positional structure-classified modified silicone oils, preferred are the side chain-modified type silicone oils represented by the structural formula (3) and the both terminal end-modified type silicone oils represented by the structural formula (6), whereas among the above chemical structure-classified modified silicone oils, preferred are the silicone oils of a mercapto-modified type, a polyether-modified type and an epoxy-modified type, and more preferred are the silicone oils of a polyether-modified type having a surface active performance.

Specific examples of the preferred modified silicone oils include commercial products available from Shin-Etsu Chemical Co., Ltd., under tradenames "KF-101", "KF-102", "KF-105", "KF-351", "KF-352", "KF-618", "KF-945", "KF-2001", "KF-2004", "X-22-163A", "X-22-163B", "X-22-167B", "X-22-169AS", "X-22-2000" and "X-22-4741", and commercial products available from BYK Chemie Japan Co., Ltd., under tradenames "BYK-307", "BYK-325" and "BYK-333".

These modified silicone oils (C) may be used alone or in the form of a mixture of any two or more thereof. The amount of the modified silicone oil (C) added is 0.005 to 4.0 parts by weight, preferably 0.005 to 3.0 parts by weight and more preferably 0.1 to 2.0 parts by weight based on 100 parts by weight of the thiirane ring-containing compound. When the amount of the modified silicone oil (C) added is less than 0.005 part by weight, the obtained coating composition tends to be insufficient in wetting property. When the amount of the modified silicone oil (C) added is more than 4 parts by weight, the coating film obtained from the coating composition tends to be deteriorated in transparency.

In the present invention, the coating composition may further contain (D) a silane coupling agent represented by the following structural formula (7), if required, to form a coating film having excellent uniformity and adhesion property:

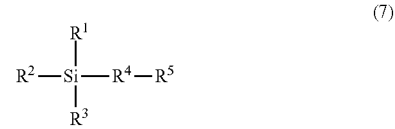

(7)

wherein $R^1$, $R^2$ and $R^3$ are each independently halogen, an alkoxy group having 1 to 4 carbon atoms or an alkyl group having 1 to 4 carbon atoms; $R^4$ is a single bond or an alkylene group having 1 to 4 carbon atoms which may contain an alkyl side chain having 1 to 4 carbon atoms; and $R^5$ is a reactive group such as a vinyl group; a styryl group; a (meth)acryloyl group; an epoxy-containing group, e.g., glycidyl group; an amino-containing group, e.g., amino group, aminoethylamino group and phenylamino group; a mercapto group; an isocyanate group; a halogen group; and an ureido group, which may contain an alkyl side chain having 1 to 4 carbon atoms.

Specific examples of the silane coupling agent (D) include vinyl trichlorosilane, vinyl trimethoxysilane, vinyl triethoxysilane, 4-styryl trimethoxysilane, γ-acryloxypropyl trimethoxysilane, γ-methacryloxypropyl trimethoxysilane, γ-methacryloxypropyl triethoxysilane, γ-methacryloxypropylmethyl dimethoxysilane, γ-methacryloxypropylmethyl diethoxysilane, γ-glycidoxypropyl trimethoxysilane, γ-glycidoxypropyl triethoxysilane, γ-glycidoxypropylmethyl dimethoxysilane, γ-glycidoxypropylmethyl diethoxysilane, β-(3,4-epoxycyclohexyl)ethyltrimethoxysilane, γ-(3,4-epoxycyclohexyppropyl trimethoxysilane, γ-aminopropyl trimethoxysilane, γ-aminopropyl triethoxysilane, N-aminoethyl-γ-aminopropyl trimethoxysilane, N-aminoethyl-γ-aminopropyl triethoxysilane, N-aminoethyl-γ-aminopropylmethyl dimethoxysilane, N-aminoethyl-γ-aminopropylmethyl diethoxysilane, N-phenyl-γ-aminopropyl trimethoxysilane, γ-mercaptopropyl trimethoxysilane, γ-mercaptopropyl triethoxysilane, γ-mercaptopropylmethyl dimethoxysilane, γ-mercaptopropylmethyl diethoxysilane, γ-isocyanatopropyl trimethoxysilane, γ-isocyanatopropyl triethoxysilane, γ-chloropropyl trimethoxysilane, γ-chloropropyl triethoxysilane, γ-ureidopropyl trimethoxysilane, γ-ureidopropyl triethoxysilane and bis(triethoxysilylpropyl)tetrasulfide.

Among the preferred silane coupling agents (D) illustrated above, more preferred are the epoxy- or mercapto-containing silane coupling agents such as γ-glycidoxypropyl trimethoxysilane, γ-glycidoxypropyl triethoxysilane, γ-glycidoxypropylmethyl dimethoxysilane, γ-glycidoxypropylmethyl diethoxysilane, β-(3,4-epoxycyclohexyl)ethyl trimethoxysilane, γ-(3,4-epoxycyclohexyl)propyl trimethoxysilane, γ-mercaptopropyl trimethoxysilane, γ-mercaptopropyl triethoxysilane, γ-mercaptopropylmethyl dimethoxysilane and γ-mercaptopropylmethyl diethoxysilane, and still more preferred are the mercapto-containing silane coupling agents such as γ-mercaptopropyl trimethoxysilane, γ-mercaptopropyl triethoxysilane, γ-mercaptopropylmethyl dimethoxysilane and γ-mercaptopropylmethyl diethoxysilane.

These silane coupling agents (D) may be used alone or in the form of a mixture of any two or more thereof. The amount of the silane coupling agent (D) added is preferably 1 to 30 parts by weight and more preferably 1 to 20 parts by weight based on 100 parts by weight of the thiirane ring-containing compound (A).

In the present invention, the coating composition may further contain, if required, an inorganic filler to obtain a coating film having excellent refractive index and hardness.

Specific examples of the inorganic filler include silica, alumina, calcium oxide, titania, cerium oxide, zirconia, zinc oxide, tin oxide, cadmium oxide, antimony oxide, composite materials of these compounds, and fillers obtained by introducing a polymerizable functional group into these compounds. To ensure a good transparency of the resultant product, these inorganic fillers preferably have a fine particle size, more specifically, have a number-average particle size of 50 nm or less.

The inorganic fillers illustrated above may be used alone or in the form of a mixture of any two or more thereof. The amount of the inorganic filler added is 1 to 100 parts by weight and preferably 5 to 50 parts by weight based on 100 parts by weight of the thiirane ring-containing compound (A).

Also, in the case where the inorganic filler is added to the coating composition, in order to enhance the dispersibility, etc., there may be used known solvents or dispersants which are suitably used in ordinary applications.

In the present invention, the coating composition may further contain, if required, a thiol group-containing compound other than the silane coupling agents to form a coating film exhibiting a less discoloration and an excellent transparency. The thiol group-containing compound means an organic compound containing one or more thiol groups in a molecule thereof. In view of enhancing the hardness of the resultant coating film, the use of such a compound having two or more thiol groups is preferred.

Specific examples of the thiol group-containing compound include methane dithiol, methane trithiol, 1,2-dimercaptoethane, bis(2-mercaptoethyl)sulfide, bis(2,3-dimercaptopropyl)sulfide, 1,2,3-trimercaptopropane, 2-mercaptomethyl-1,3-dimercaptopropane, 4-mercaptomethyl-1,8-dimercapto-3,6-dithiaoctane, 2,4-bis(mercaptomethyl)-1,5-dimercapto-3-thiapentane, 4,8-bis(mercaptomethyl)-1,11-dimercapto-3,6,9-trithiaundecane, 4,7-bis(mercaptomethyl)-1,11-dimercapto-3,6,9-trithiaundecane, 5,7-bis(mercaptomethyl)-1,11-dimercapto-3,6,9-trithiaundecane, 1,2,7-trimercapto-4,6-dithiaheptane, 1,2,9-trimercapto-4,6,8-trithianonane, 1,2,8,9-tetramercapto-4,6-dithianonane, 1,2,10,11-tetramercapto-4,6,8-trithiaundecane, 1,2,12,13-tetramercapto-4,6,8,10-tetrathiatridecane, tetrakis(mercaptomethyl)methane, tetrakis(4-mercapto-2-thiabutyl)methane, tetrakis(7-mercapto-2,5-dithiaheptyl)methane, trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 2,5-bis(mercaptomethyl)-1,4-dithiane, bis(4-mercaptophenyl)sulfide, bis(4-mercaptomethylphenyl)methane, 2,2-bis(4-mercaptomethylphenyl)propane, bis(4-mercaptomethylphenyl)ether and bis(4-mercaptomethylphenyl)sulfide.

The preferred thiol group-containing compounds illustrated above may be used alone or in the form of a mixture of any two or more thereof. The amount of the thiol group-containing compound added is 0.1 to 100 parts by weight and preferably 1 to 50 parts by weight based on 100 parts by weight of the thiirane ring-containing compound (A).

Further, in order to desirably control properties of the coating film obtained by curing the coating composition, a compound which is reactive with a part or whole of the composition may be further added thereto, if required. Examples of the compound reactive with a part or whole of the composition include epoxy compounds, iso(thio)cyanates, carboxylic acids, carboxylic anhydrides, phenols, amines, vinyl compounds, allyl compounds, acrylic compounds and methacrylic compounds. The compound which is reactive with a part or whole of the composition may be added to the composition in an amount of 1 to 200 parts by weight based on 100 parts by weight of the thiirane ring-containing compound (A).

In the polymerization and curing method used in the present invention, the coating composition applied onto an optical element is heated at a temperature of 20 to 200° C. for a period of from several minutes to several days to obtain an optical product having a cured coating film. Examples of a heating source used for curing the coating composition include an electric oven, a constant temperature oven and a dryer.

The coating composition of the present invention may also contain various additives, e.g., antioxidants such as phenol-based compounds and phosphite-based compounds, bluing agents such as oil-soluble dyes, typically anthraquinone-based compounds, ultraviolet absorbers such as benzophenone-based compounds and benzotriazole-based compounds, thixotropic agents and antistatic agents to enhance utility of the resultant optical elements.

Upon applying the coating composition, a diluent, etc., may be added thereto, if required, to suitably control a viscosity of the composition. Examples of the diluent include generally used organic solvents such as ethanol, acetone, MEK, ethyl acetate, THF, toluene and methylene chloride. The coating composition may be applied using a coating device such as a hand coater, a bar coater and a spin coater, if required.

The coating composition of the present invention may be applied onto various substrates according to uses and applications thereof, thereby generally exhibiting a good wetting property thereon. Examples of the substrate include substrates made of plastic materials such as PMMA, PET, PC, cellulose triacetate (TAC) and alicyclic polyolefins, substrates made of inorganic material such as glass, quartz and ceramic materials, and substrates made of metals such as aluminum, stainless steel (SUS) and nickel. Meanwhile, a surface of the plastic substrate having a poor chemical resistance is preferably protected with an inorganic thin film made of silica, etc.

The coating composition is preferably handled and dealt with in a clean room to avoid inclusion of dusts or foreign matters thereinto, and may be cured in a flowing inert gas atmosphere such as nitrogen and helium or by covering the coating film with an appropriate film.

The coating composition is preferably previously subjected to deaeration treatment and filtration treatment before polymerization and curing thereof to obtain an optical element having a high transparency. The deaeration treatment is usually conducted under a reduced pressure of 0.001 to 50 torr at a temperature of 0 to 100° C. for 1 min to 24 h, and the filtration treatment may be conducted by passing through a filter made of PTFE or PET having a pore diameter of about 0.05 to 10 μm.

EXAMPLES

The present invention will be described in more detail by reference to the following examples, but it should be noted that these examples are only illustrative and not intended to limit the scope of the present invention thereto.

Example 1

One hundred parts by weight of bis(β-epithiopropyl)sulfide, 1.0 part by weight of tetrabutyl phosphonium bromide and 0.1 part by weight of a modified silicone oil "KF-351 (tradename)" available from Shin-Etsu Chemical Co., Ltd., were intimately mixed with each other to obtain a uniform coating composition. The thus obtained coating composition was deaerated at 20° C. under 1 torr for 5 min, and filtered through a 0.5 μm-mesh PTFE membrane filter. Next, the thus treated coating composition was applied onto a PET (polyethylene terephthalate) substrate using a bar coater (#09) to prepare a sample. The thus obtained sample was heated and cured at 120° C. for 5 min. Evaluation results of a wetting property of the coating composition as well as a discoloration, transparency and uniformity of the resultant cured product are shown in Table 1.

Meanwhile, the wetting property, discoloration, transparency and uniformity were evaluated by the following methods, and Rank B or more was regarded as being acceptable.

The wetting property was evaluated according to the following ratings by observing a retention time of the coating film after coating by naked eyes.
A: No cissing occurred for 1 h or longer;
B: Cissing occurred within 1 h; and
C: Cissing occurred within 10 min.

The discoloration was evaluated according to the following ratings by observing a coated substrate placed on a white paper by naked eyes.
A: No discoloration observed;
B: Yellowish discoloration slightly observed; and
C: Yellowish discoloration clearly observed.

The transparency was evaluated according to the following ratings by observing a coated substrate placed on a black paper by naked eyes under a fluorescent lamp in a dark room.
A: Transparent;
B: Slight blooming observed; and
C: Completely opaque.

The uniformity was evaluated according to the following ratings by observing a surface condition of a coating film by naked eyes.
A: Flat coating surface;
B: Substantially flat coating surface; and
C: Noticed irregularities on a coating surface.

Examples 2 to 4 and Comparative Examples 1 to 3

The same procedure as in Example 1 was repeated except that the amount of the modified silicone oil added ("KF-351 (tradename)" available from Shin-Etsu Chemical Co., Ltd.) was changed as shown in Table 1. The results are shown in Table 1.

Examples 5 to 17

The same procedure as in Example 1 was repeated except that the modified silicone oil was replaced with those shown in Table 2. The results are shown in Table 1. Meanwhile, the modified silicone oils represented by model names having capitals of "KF" and "X-22" are products available from Shin-Etsu Chemical Co., Ltd., and the modified silicone oils represented by model names having capitals of "BYK" are products available from BYK Chemie Japan Co., Ltd.

TABLE 1

| | Kind of modified silicone oil | Amount of modified silicone oil added (wt part) | Kind of substrate |
| --- | --- | --- | --- |
| Example 1 | KF-351 | 0.1 | PET |
| Example 2 | KF-351 | 0.01 | PET |
| Example 3 | KF-351 | 1.0 | PET |
| Example 4 | KF-351 | 3.0 | PET |
| Comparative Example 1 | None | 0 | PET |
| Comparative Example 2 | KF-351 | 0.001 | PET |
| Comparative Example 3 | KF-351 | 5.0 | PET |

| | Wetting property | Evaluation of discoloration | Transparency | Uniformity |
| --- | --- | --- | --- | --- |
| Example 1 | A | A | A | A |
| Example 2 | B | A | A | A |
| Example 3 | A | A | B | A |
| Example 4 | A | A | B | A |
| Comparative Example 1 | C | A | A | C |
| Comparative Example 2 | C | A | A | B |
| Comparative Example 3 | A | A | C | A |

TABLE 2

| | Kind of modified silicone oil (wt part) | Kind of substrate | Wetting property |
| --- | --- | --- | --- |
| Example 5 | KF-351 (0.1) | PET | A |
| Example 6 | KF-945 (0.1) | PET | A |
| Example 7 | KF-618 (0.1) | PET | A |

TABLE 2-continued

| | | | |
|---|---|---|---|
| Example 8 | BYK-307 (0.1) | PET | A |
| Example 9 | BYK-325 (0.1) | PET | A |
| Example 10 | BYK-333 (0.1) | PET | A |
| Example 11 | X-22-167B (0.1) | PET | A |
| Example 12 | KF-2001 (0.1) | PET | B |
| Example 13 | KF-105 (0.1) | PET | A |
| Example 14 | X-22-163A (0.1) | PET | A |
| Example 15 | KF-101 (0.1) | PET | A |
| Example 16 | X-22-169AS (0.1) | PET | A |
| Example 17 | X-22-4741 (0.1) | PET | A |

| | Evaluation of discoloration | Transparency | Uniformity |
|---|---|---|---|
| Example 5 | A | A | A |
| Example 6 | A | A | A |
| Example 7 | A | A | B |
| Example 8 | A | A | A |
| Example 9 | A | A | A |
| Example 10 | A | A | A |
| Example 11 | A | A | B |
| Example 12 | A | A | B |
| Example 13 | A | A | A |
| Example 14 | A | A | A |
| Example 15 | A | A | A |
| Example 16 | A | A | A |
| Example 17 | A | A | A |

Examples 18 and 19

The same procedure as in Example 1 was repeated except that the kinds and amounts of modified silicone oils as well as the kinds of substrates were changed as shown in Table 3. Meanwhile, "TAC" represents a cellulose triacetate resin, and "Zeonor" represents a tradename of an alicyclic polyolefin resin available from Nippon Zeon Co., Ltd.

Examples 20 to 22

The same procedure as in Example 1 was repeated except that "BYK-325 (tradename)" available from BYK Chemie Japan Co., Ltd., was used as the modified silicone oil in an amount of 1.0 part by weight, and the kinds of substrates were changed as shown in Table 3. Meanwhile, "SUS304" was used as the stainless steel.

Example 23

One hundred parts by weight of bis(β-epithiopropyl)sulfide, 1.0 part by weight of tetrabutyl phosphonium bromide, 1.0 part by weight of a modified silicone oil "BYK-325 (tradename)" available from BYK Chemie Japan Co., Ltd., and 10 parts by weight of γ-mercaptopropyl trimethoxysilane "KBM-803 (tradename)" available from Shin-Etsu Chemical Co., Ltd., were intimately mixed with each other to obtain a uniform coating composition. The thus obtained coating composition was deaerated at 20° C. under 1 torr for 5 min, and filtered through a 0.5 μm-mesh PTFE membrane filter. Next, the thus treated coating composition was applied onto a glass substrate using a bar coater (#09) to prepare a sample. The thus obtained sample was heated at 120° C. for 5 min, and further heated and cured at 70° C. for 20 h. Evaluation results of a wetting property of the coating composition as well as a discoloration, transparency, uniformity and adhesion property of the resultant cured product are shown in Table 4.

Meanwhile, the adhesion property was evaluated according to the following ratings by immersing a coated substrate in 80° C. hot water for 1 h, and then observing the coated substrate by naked eyes.

○: No separation of coating film from substrate occurred; and x: Separation of coating film from substrate occurred Examples 24 And Comparative Example 4

The same procedure as in Example 23 was repeated except that the silane coupling agent was changed as shown in Table 4. Meanwhile, "KBM-403 (γ-glycidoxypropyl trimethoxysilane)" is a silane coupling agent available from Shin-Etsu Chemical Co., Ltd.

TABLE 3

| | Kind of modified silicone oil (wt part) | Kind of substrate | Wetting property |
|---|---|---|---|
| Example 18 | KF-351 (0.1) | TAC | A |
| Example 19 | BYK-325 (0.5) | Zeonor | A |
| Example 20 | BYK-325 (1.0) | Glass | A |
| Example 21 | BYK-325 (1.0) | Quartz | A |
| Example 22 | BYK-325 (1.0) | Stainless steel | A |

| | Evaluation of discoloration | Transparency | Uniformity |
|---|---|---|---|
| Example 18 | A | A | A |
| Example 19 | A | A | A |
| Example 20 | A | B | B |
| Example 21 | A | B | B |
| Example 22 | A | B | A |

TABLE 4

| | Kind of modified silicone oil (wt part) | Kind of silane coupling agent (wt part) | Kind of substrate | Wetting property |
|---|---|---|---|---|
| Example 23 | BYK-325 (1.0) | KBM-803 (10) | Glass | A |
| Example 24 | BYK-325 (1.0) | KBM-403 (10) | Glass | A |
| Comparative Example 4 | BYK-325 (1.0) | None | Glass | A |

| | Evaluation of discoloration | Transparency | Uniformity | Adhesion property |
|---|---|---|---|---|
| Example 23 | A | B | B | ○ |
| Example 24 | A | B | B | ○ |
| Comparative Example 4 | A | B | B | x |

INDUSTRIAL APPLICABILITY

In accordance with the present invention, there is provided a coating composition comprising (A) 100 parts by weight of a thiirane ring-containing compound, (B) 0.0001 to 10 parts by weight of a catalyst for accelerating polymerization of the thiirane ring-containing compound, and (C) 0.005 to 4 parts by weight of a modified silicone oil. The coating composition of the present invention exhibits a good wetting property, and is capable of forming a coating film having a high refractive index, a less discoloration and excellent transparency and uniformity.

The invention claimed is:
1. A process for forming a coated substrate, comprising:
coating a coating composition on a substrate so as to form a coating film on the substrate,
wherein said coating composition comprises:

(A) 100 parts by weight of a thiirane ring-containing compound,
(B) 0.0001 to 10 parts by weight of a catalyst for accelerating polymerization of the thiirane ring-containing compound, and
(C) 0.005 to 4 parts by weight of a modified silicone oil selected from the group consisting of:

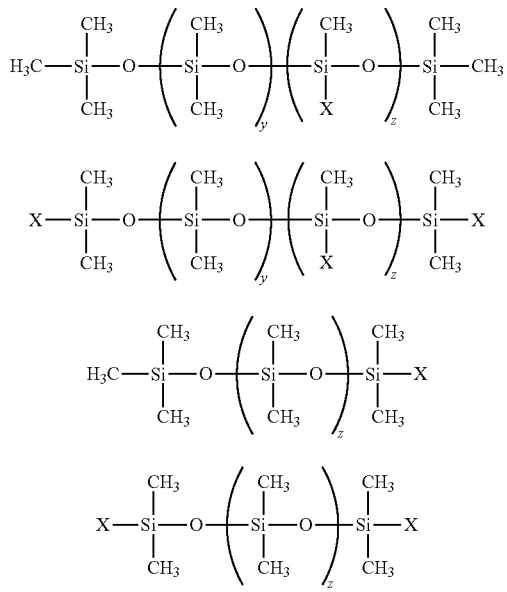

(3)
(4)
(5)
(6)

wherein X is each independently halogen, an alkoxy group having 1 to 36 carbon atoms, an alkyl group having 1 to 36 carbon atoms, an aliphatic ester group having 1 to 36 carbon atoms, a polyether group which contains a hydrocarbon group having 1 to 36 carbon atoms in total; and y and z are each independently an integer of 1 or more, and
wherein said coating film has a thickness of 1 to 100 μm.

2. The process according to claim 1, the coating composition further comprising 1 to 30 parts by weight of (D) a silane coupling agent.

3. A coated optical product comprising the coated substrate formed by the process of claim 1, wherein the substrate is an optical product.

4. The process according to claim 1, wherein said coating composition further includes an inorganic filler.

5. The process according to claim 1, said coating composition containing 0.005 to 3.0 parts by weight of said compound (C) based on 100 parts by weight of the compound (A).

6. The process according to claim 1, said coating composition containing 0.1 to 2.0 parts by weight of said compound (C) based on 100 parts by weight of the compound (A).

7. The process according to claim 1, wherein said substrate is made of a material selected from the group consisting of plastic material, metal material and inorganic material other than the metal material.

8. The process according to claim 1, wherein the substrate is made of a material selected from the group consisting of PMMA, PET, PC, cellulose triacetate, alicyclic polyolefins, glass, quartz, ceramic materials, aluminum, stainless steel and nickel.

9. The process according to claim 1, wherein the compound (A) is bis(β-epithiopropyl)sulfide, and the catalyst (B) is tetra-n-butyl phosphonium bromide.

10. The process according to claim 1, wherein said coating film is provided directly in contact with said substrate.

11. The process according to claim 1, wherein said substrate is made of a material selected from the group consisting of PMMA, PET, PC, cellulose triacetate, alicyclic polyolefins, ceramic materials, aluminum, stainless steel and nickel.

12. A coated optical product comprising the coated substrate formed by the process of claim 4, wherein the substrate is an optical product.

13. The process according to claim 4, wherein said substrate is an optical product.

14. The process according to claim 1, wherein said substrate is an optical product.

* * * * *